UNITED STATES PATENT OFFICE.

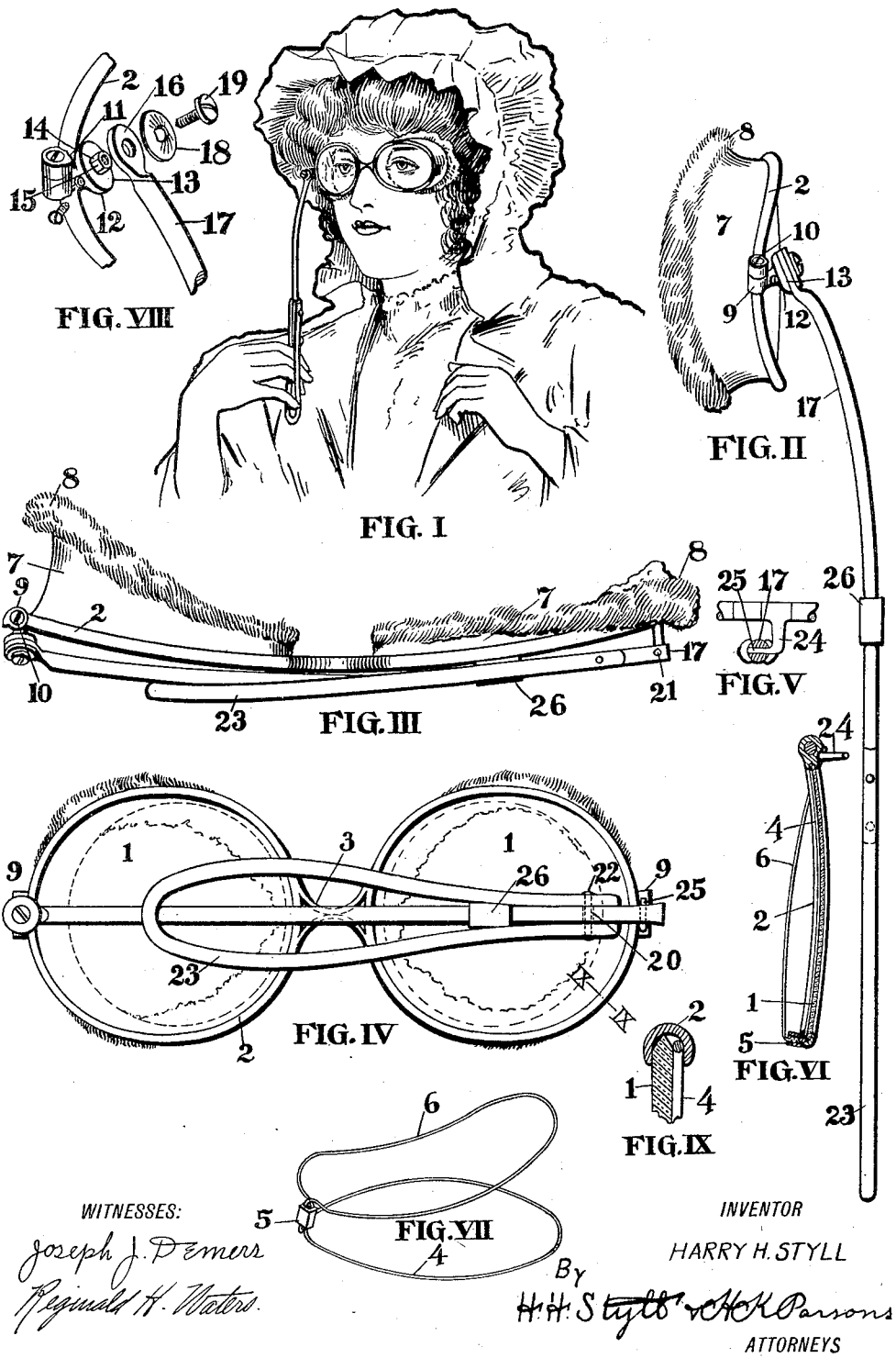

HARRY H. STYLL, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

GOGGLES.

1,105,714.      Specification of Letters Patent.      Patented Aug. 4, 1914.

Application filed March 2, 1912. Serial No. 681,145.

*To all whom it may concern:*

Be it known that I, HARRY H. STYLL, a citizen of the United States, residing at Southbridge, in the county of Worcester and State of Massachusetts, have invented certain new and useful Improvements in Goggles, of which the following is a specification.

My invention relates to improvements in goggles, and has for its leading object the provision of an improved form of goggle of the lorgnette type which will dispense with the awkward and ungainly fastening now customarily used upon goggles and will permit the wearer to readily hold the goggles in position to protect the eye when it is desired or to remove the goggles at times when there is no necessity for protection, such as when an automobile is stopped or going merely at a slow rate of speed.

A further object of my invention is the provision of an improved goggle of the lorgnette type which may be readily folded up to occupy a minimum amount of space when not in use but which will have joints of such nature as to automatically lock themselves to hold the parts in extended position when the goggle is in use.

Another object of my invention is the provision of means for engaging the folding handle to hold the same away from the lenses of the goggle and thus to reduce to a minimum the liability of breaking of said lenses by pressing of the handle thereagainst when the goggle is folded.

Other objects and advantages of my improved goggle will be readily apparent by reference to the following description taken in connection with the accompanying drawings, and it will be understood that I may make any modifications in the specific details shown and described within the scope of the appended claims without departing from or exceeding the spirit of my invention.

Figure I represents a view of my improved goggles in use. Fig. II represents a side elevation of my goggles illustrating the position occupied by the various parts when the goggles are in use. Fig. III represents an edge view of the goggles in folded position. Fig. IV represents a plan view of my device with the parts in the position shown in Fig. III. Fig. V represents an enlarged detail view of the means for holding the handle in correct folded position, the handle being shown in section. Fig. VI represents a fragmentary sectional view. Fig. VII represents a perspective view of the eye wire frame and support therefor. Fig. VIII represents a fragmentary perspective view illustrating the structure of the pivot lug for the handle and the means for frictionally resisting pivotal movement of the handle. Fig. IX represents an enlarged fragmentary sectional view illustrating the securing of the lens and eye cup frames.

In the drawings, in which similar characters of reference are employed throughout to denote corresponding views, the numeral 1 designates the lenses of my goggle which may be either plain cylinders or may be made up as prescription lenses according to the requirements of the individual wearer of my goggle. Said lenses are each inclosed by the eye wire or frame portion 2, the frames of the two lenses being connected by a suitable bridging portion 3 adapted to span the nose of the wearer. Instead of the eye wire or frame members 2 of my goggles being made as is usual just large enough to accommodate the thickness of the lens, I make the same sufficiently large to receive in the interior groove thereof the ring 4 which terminates in the twisted spring portion 5 disposed adjacent the bridge 3, said twisted portion 5 terminating in a second ring 6, the diameter of the ring 6 being less than a line extending from the terminus of the twisted portion 5 to the outer end of the ring 4. The purpose of this construction will be later described. Inclosing the two rings 4 and 6 and serving to connect the same is a tube of crape or other textile material, said tube 7 thus forming the walls of the eye cup and excluding dirt from entering the eyes of the wearer of my goggles from around the lenses, said tube preferably terminating in a buffer portion 8 adapted to rest against the face to make the cup fit more comfortably than would be the case did the wire ring rest thereagainst.

It will be understood that on account of the resiliency of the twisted portion 5 and of the ring 6 the eye cup formed by the wire frame member and its inclosing textile tube may be flattened as desired either by pressure against the face or by flattening out when it is desired to fold the goggle. In some instances it will prove desirable to fold the goggle into the flattest possible form to be readily placed within a thin case, while in other cases the wearer may require simply to fold up the goggles and slip the same into a hand bag or into a pocket. If in either event it is not desirable to have the eye cups in their regular extended position, to obviate this difficulty and hold the eye cup in collapsed position when desired, I make use of the customary lug 9 on the ends of the frame members 2, which lugs are connected by the screw 10 serving to draw the lugs together and let the ends of the frame clamp the eye cup wire and the lens in position within the frame. These lugs are formed on the forward side thereof with the groove 11 sufficiently deep to receive and securely engage the end of the ring 6, it being necessary to slightly distort and elongate the ring 6 to permit of hooking thereof around the lug 9 and consequently the spring and the portion 5 and ring 6 serve to securely hold the ring 6 within the groove 11.

Secured either to the frame of the goggles or to one of the lugs 9 at one side thereof to support the folding handle of my goggles is the pivot lug 12 having the shoulder 13 intermediate the length thereof terminating in the tang 14 which has a flattened side 15. Said lug is preferably disposed at an angle to the plane of the lenses so that as the handle is swung on the pivot lug it will move forward toward the lenses to fold closely thereagainst. Rotatably mounted upon the portion 14 of the lug is the flattened end 16 of the main handle rod 17, a spring washer 18 being nonrotatably mounted on the lug 14 and locked in place by the screw 19 and serving to frictionally engage the handle member 17 to tend to resist pivotal movement thereof, and hold the same in desired adjusted position. Said handle 17 has formed therethrough a pair of apertures 20 and 21, a rivet 22 passing through the inner aperture 20 and serving to pivotally secure in position the looped auxiliary handle member 23, said rivet being fixed in one end of the looped handle member 23 and slidably engaged in the aperture 20 and in the other end of the looped handle member. The inner faces of the two ends of the looped auxiliary handle are grooved to fit against the member 17, the inherent spring in the loop causing the ends of the auxiliary handle to so engage the main handle as to automatically lock the parts in either open or folded position, as will be readily apparent by reference to the drawing.

By reference particularly to Fig. III of the drawings the folded position of the various parts of my improved goggle will be readily apparent, and it will be seen that the same is folded to occupy but very little space. In its folded position, however, the handle portions lie very close to the lenses of the goggle and a sudden pressure or jolt against the handle will be liable to force the same down upon the lenses with a tendency to crack the lenses. To prevent this from occurring, I secure to the opposite end of the frame from that on which the lug 12 is located the L-shaped lug 24 which forms a hook, the end 25 of said lug being adapted to pass through the aperture 21 formed in the end of the main handle member and thus to secure the end of the handle member in position adjacent the lenses and yet out of contact therewith. The handle being thus supported at both ends is prevented from being forced into engagement with the lenses by any ordinary pressure and consequently the liability of the lenses to be broken by contact of the handle therewith is reduced to a minimum. A buffer 26 on the handle 17 also at all times prevents the handle from contacting with the lenses.

From the foregoing description taken in connection with the accompanying drawings, the construction and use of my improved goggle will be readily apparent, and it will be seen that I have provided an extremely practical desirable and efficient goggle which may be readily folded into very small space and by which liability of breaking of the lenses of the goggle is reduced to a minimum. It will be further observed that my goggle will particularly recommend itself to ladies or others taking pleasure rides in automobiles and who do not have to drive their own machines, in that my goggle will satisfactorily protect the eyes from wind or dust and may be readily held before the face but may with equal facility be removed from before the eyes when desired without the necessity of fumbling with awkward and cumbersome fastenings such as are used on the ordinary goggles now in use, and without the mussing of the hair now occasioned by said fastenings.

I claim:

1. As an article of manufacture, a goggle, comprising a frame, transparent disks mounted in the frame, resilient eye cups carried by said frame, means for locking said eye cups in folded position, and a folding handle pivoted to one side of the goggles and adapted to fold over the same.

2. A goggle, comprising a frame for supporting transparent disks, a handle pivoted to the frame and adapted to fold thereover, and means for locking the handle in folded position and holding the same out of contact with the transparent disks.

3. As an article of manufacture a goggle including a frame, transparent disks mounted in the frame, resilient eye cup frames carried by the main frame, dust shields carried by the eye cup frames, means for locking the eye cup frames in folded position, a folding handle for the goggle, and means for securing the free end of the handle in folded position and in desired spaced relation to the transparent disks.

4. A goggle, including a frame, transparent disks supported by the frame, a pivot supported by the frame and projecting therefrom at an angle thereto, a main handle section pivotally mounted on the pivot, means for frictionally resisting pivotal movement of the handle section, a supplemental handle section pivoted to the first, means for automatically locking the supplemental handle section in adjusted position, and means for locking the entire handle in folded position in desired spaced relation to the transparent disks of the goggle.

5. In a goggle, the combination with a frame, of lenses mounted therein, a handle section pivoted to one side of the frame, a supplemental handle section pivotally secured to the first mentioned handle section intermediate the ends thereof, means for frictionally locking the main handle section in desired adjusted position relative to the goggle frame, means for frictionally locking the supplemental handle in desired adjusted position relative to the main handle section, and a locking device carried by the goggle frame for engaging the main handle section, said main handle section having a portion thereof exterior to the point of attachment of the supplemental handle adapted for interlocking engagement with the fastener on the frame.

6. A goggle, comprising a frame, transparent disks mounted in the frame, a resilient eye cup carried by said frame, and means for locking said eye cup in folded position.

In testimony whereof I affix my signature in presence of two witnesses.

HARRY H. STYLL.

Witnesses:
REGINALD H. WATERS,
JOSEPH J. DEMERS.

---

Copies of this patent may be obtained for five cents each, by addressing the " Commissioner of Patents, Washington, D. C."